US012595154B2

(12) United States Patent
Toyama et al.

(10) Patent No.: US 12,595,154 B2
(45) Date of Patent: Apr. 7, 2026

(54) ELEVATOR BRAKE DEVICE DETERIORATION PREDICTION SYSTEM

(71) Applicants: Mitsubishi Electric Corporation, Tokyo (JP); Mitsubishi Electric Building Solutions Corporation, Tokyo (JP)

(72) Inventors: Yasuhiro Toyama, Tokyo (JP); Koji Sakata, Tokyo (JP); Satoshi Shiga, Tokyo (JP)

(73) Assignees: MITSUBISHI ELECTRIC CORPORATION, Tokyo (JP); MITSUBISHI ELECTRIC BUILDING SOLUTIONS CORPORATION, Tokyo (JP)

( * ) Notice: Subject to any disclaimer, the term of this patent is extended or adjusted under 35 U.S.C. 154(b) by 1353 days.

(21) Appl. No.: 17/274,441

(22) PCT Filed: Oct. 19, 2018

(86) PCT No.: PCT/JP2018/039046
§ 371 (c)(1),
(2) Date: Mar. 9, 2021

(87) PCT Pub. No.: WO2020/079839
PCT Pub. Date: Apr. 23, 2020

(65) Prior Publication Data

US 2021/0269281 A1 Sep. 2, 2021

(51) Int. Cl.
*B66B 5/00* (2006.01)

(52) U.S. Cl.
CPC .................................. *B66B 5/0018* (2013.01)

(58) Field of Classification Search
CPC ......... B66B 1/24; B66B 1/26; B66B 1/28–30; B66B 1/32; B66B 1/34; B66B 1/3415;
(Continued)

(56) References Cited

U.S. PATENT DOCUMENTS 9,556,002 B2 * 1/2017 Wilke .................... B66B 5/0025
11,286,133 B2 * 3/2022 Trcka .................... B66B 1/3461
(Continued)

FOREIGN PATENT DOCUMENTS

JP 2008-230742 A 10/2008
JP 2008-258897 A 10/2008
(Continued)

OTHER PUBLICATIONS

International Search Report and Written Opinion mailed on Jan. 22, 2019, received for PCT Application PCT/JP2018/039046 Filed on Oct. 19, 2018, 9 pages including English Translation.
(Continued)

*Primary Examiner* — Christopher Uhlir
(74) *Attorney, Agent, or Firm* — XSENSUS LLP

(57) ABSTRACT

An object of the present invention is to provide a brake device deterioration prediction system capable of accurately predicting a deterioration time of a brake device. The brake device deterioration prediction system includes an observation unit, a conversion unit, a generation unit, and a prediction unit. The observation unit acquires operation data regarding the operation of the brake device when the brake device operates. The conversion unit converts the operation data into index data indicating deterioration of the brake device for each preset unit of time. The generation unit generates a deterioration model including a trend component showing a trend of long-term change and a periodic component showing a periodic change, as a model showing a change-with-time of deterioration represented by the index data. The prediction unit predicts the deterioration time of the brake device based on the deterioration model.

17 Claims, 4 Drawing Sheets

(58) Field of Classification Search
CPC ........... B66B 1/3423; B66B 1/36; B66B 5/00; B66B 5/0006; B66B 5/0018–0037; B66B 5/02; B66B 5/027; B66B 5/04; B66B 5/06; B66B 5/16–24
See application file for complete search history.

(56) References Cited

U.S. PATENT DOCUMENTS

| | | | | |
|---|---|---|---|---|
| 11,560,288 | B2 * | 1/2023 | Hatori | B66B 5/0012 |
| 2016/0304314 | A1 * | 10/2016 | Xie | B66B 5/0031 |
| 2017/0178015 | A1 | 6/2017 | Sato et al. | |
| 2018/0154529 | A1 | 6/2018 | Shimizu et al. | |
| 2022/0414614 | A1 * | 12/2022 | Eleid | B66B 25/006 |

FOREIGN PATENT DOCUMENTS

| | | | |
|---|---|---|---|
| JP | 2014-214797 | A | 11/2014 |
| JP | 2015-018389 | A | 1/2015 |
| JP | 5792028 | B2 | 10/2015 |
| JP | 2016-033778 | A | 3/2016 |
| JP | 2017-014007 | A | 1/2017 |
| JP | 2017-117013 | A | 6/2017 |
| WO | 2016/185593 | A1 | 11/2016 |

OTHER PUBLICATIONS

Office Action issued on Jan. 13, 2022, in corresponding Indian patent Application No. 202147010001, 5 pages.
Korean Office Action issued Feb. 10, 2023, in corresponding Korean Patent Application No. 10-2021-7010885, 1 9pp.

* cited by examiner

ELEVATOR BRAKE DEVICE DETERIORATION PREDICTION SYSTEM

CROSS-REFERENCE TO RELATED APPLICATION

The present application is based on PCT filing PCT/JP2018/039046, filed Oct. 19, 2018, the entire contents of which is incorporated herein by reference.

FIELD

The present invention relates to an elevator brake device deterioration prediction system.

BACKGROUND

An example of a deterioration prediction system is described in Patent Literature 1. The deterioration prediction system extracts data effective for deterioration prediction based on the amount of change in measured data. The deterioration prediction system calculates a deterioration threshold value based on the extracted data. The deterioration prediction system predicts the time when the measured data would reach the deterioration threshold value.

CITATION LIST

Patent Literature

[PTL 1] JP 2017-117013 A

SUMMARY

Technical Problem

However, the deterioration prediction system of Patent Literature 1 predicts the time when the deterioration threshold value would be reached by using a linear equation with respect to time. On the other hand, elevator brake devices can be affected by seasonal changes. Therefore, when the deterioration prediction system of Patent Literature 1 is applied to an elevator brake device, the deterioration time of the brake device cannot be predicted accurately.

The present invention has been made to solve such a problem. An object of the present invention is to provide a deterioration prediction system capable of accurately predicting a deterioration time of a brake device.

Solution to Problem

An elevator brake device deterioration prediction system according to the present invention includes: an observation unit that acquires operation data regarding a operation of a brake device when the brake device braking an elevator car operates; a conversion unit that converts the operation data acquired by the observation unit into index data, the index data indicating deterioration of the brake device for each preset unit of time; a generation unit that generates a deterioration model including a trend component showing a trend of long-term change and a periodic component showing a periodic change, as a model showing a change-with-time of deterioration represented by the index data; and a prediction unit that predicts a deterioration time of the brake device based on the deterioration model.

Advantageous Effects of Invention

According to the present invention, the brake device deterioration prediction system includes an observation unit, a conversion unit, a generation unit, and a prediction unit. The observation unit acquires operation data regarding the operation of the brake device when the brake device braking the car of the elevator operates. The conversion unit converts the operation data acquired by the observation unit into index data indicating deterioration of the brake device for each preset unit of time. The generation unit generates a deterioration model including a trend component showing a trend of long-term change and a periodic component showing a periodic change, as a model showing a change-with-time of deterioration represented by the index data. The prediction unit predicts the deterioration time of the brake device based on the deterioration model. As a result, the deterioration time of the brake device can be predicted accurately.

DESCRIPTION OF EMBODIMENT

An embodiment for carrying out the present invention is described below with reference to the accompanying drawings. In each figure, the same or corresponding parts are denoted by the same reference signs, and duplicate descriptions are appropriately simplified or omitted.

Embodiment 1

Figure 1:
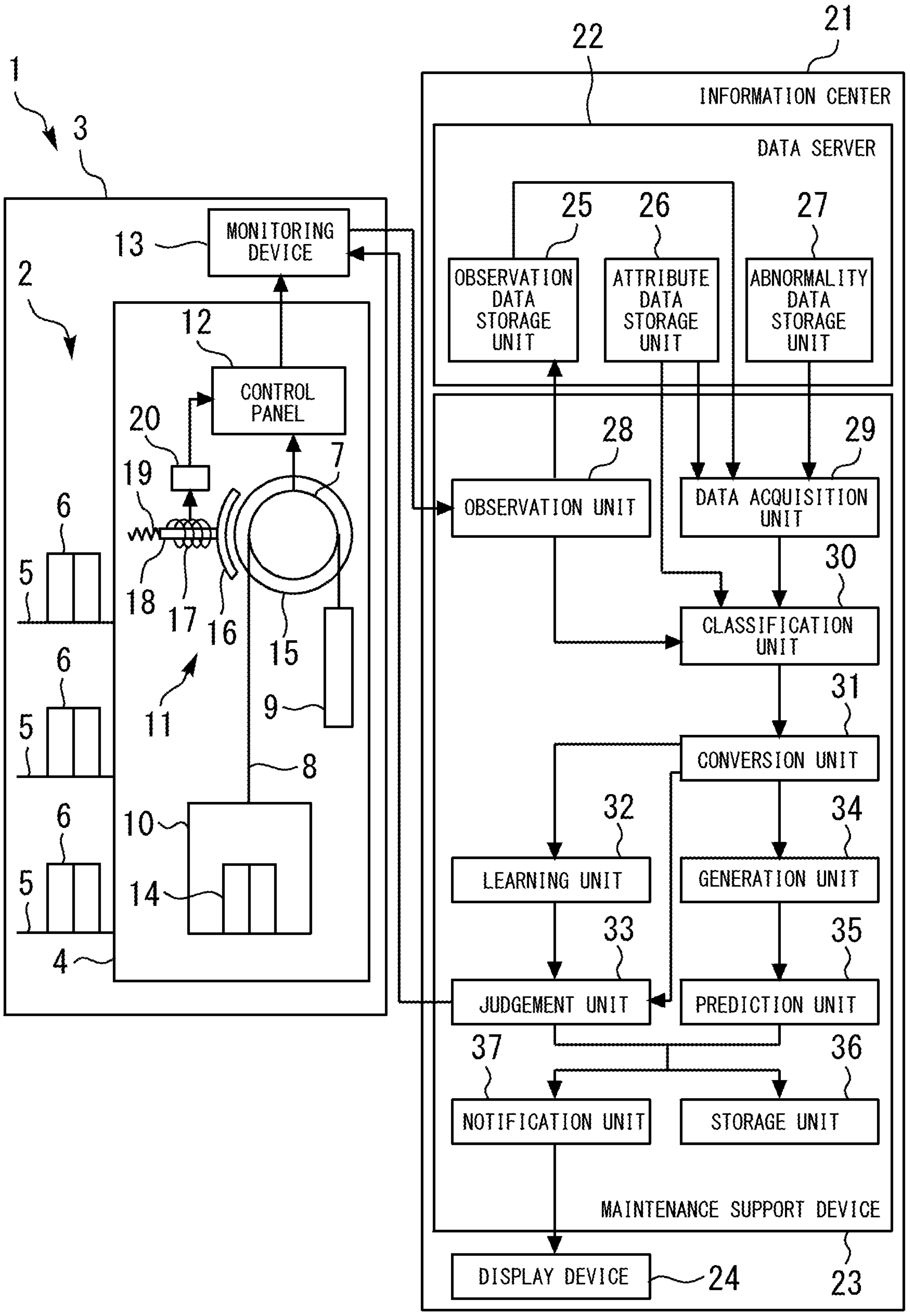
FIG. 1 Configuration diagram of the brake device deterioration prediction system according to Embodiment 1.

FIG. 1 is a configuration diagram of a brake device deterioration prediction system 1 according to Embodiment 1.

The brake device deterioration prediction system 1 is applied to an elevator 2.

The elevator 2 is provided in a building 3. The building 3 has a plurality of floors. In the elevator 2, a hoistway 4 penetrates each floor of the building 3. In the elevator 2, a hall 5 is provided on each floor of the building 3. The hall 5 on each floor faces the hoistway 4. In the elevator 2, each of a plurality of hall doors 6 is provided at the hall 5 on each floor. The elevator 2 includes a traction machine 7, a main rope 8, a counter weight 9, a car 10, a brake device 11, a control panel 12, and a monitoring device 13.

The traction machine 7 is provided, for example, on the upper part of the hoistway 4. The traction machine 7 includes a motor and a sheave. The motor of the traction machine 7 is a device for rotating the sheave.

The main rope 8 is wound around the sheave of the traction machine 7 to be allowed to move following the rotation of the sheave of the traction machine 7. One end of the main rope 8 is provided in the car 10. The other end of the main rope 8 is provided on the counter weight 9.

The counter weight 9 is provided to be allowed to run in the vertical direction inside the hoistway 4 following the movement of the main rope 8.

The car 10 is provided to be allowed to run in the vertical direction inside the hoistway 4 following the movement of the main rope 8. The car 10 includes a car door 14. The car door 14 is a device that opens and closes when the car 10 is stopped on any of the floors of the building 3. The car door 14 is a device that causes the hall door 6 to work together to open and close.

The brake device 11 is a device that brakes the car 10 when the car 10 is stopped. The brake device 11 includes a brake drum 15, a brake shoe 16, a coil 17, a plunger 18, a spring 19, and a brake control device 20. The brake drum 15 is provided on the output shaft of the motor of the traction machine 7 to be allowed to rotate in synchronization with the motor of the traction machine 7. The brake shoe 16 faces the outer surface of the brake drum 15. The brake shoe 16 is a device component that brakes the rotation of the brake drum 15 by a frictional force to brake the car 10. The spring 19 is a device component that presses the brake shoe 16 against the brake drum 15 by an elastic force. The coil 17 is a device component that generates a magnetic field by excitation. The plunger 18 is a device component that displaces the brake shoe 16 away from the brake drum 15 by the magnetic field generated by the coil 17 while resisting the elastic force of the spring 19. The brake control device 20 is a device that controls the operation of the brake device 11. The operation of the brake device 11 includes suction and release. The brake control device 20 is equipped with an element that outputs a suction command and a release command. The suction command is output when the brake device 11 brakes the car 10. The release command is output when the brake device 11 releases the car 10. The brake device 11 may include a brake arm that transmits the elastic force of the spring 19 to the brake shoe 16.

The control panel 12 is provided, for example, on the upper part of the hoistway 4. The control panel 12 is a device that controls the operation of the elevator 2. The operation of the elevator 2 includes, for example, run of the car 10. The control panel 12 is connected to the traction machine 7 and the brake device 11 to be allowed to control the operation of the elevator 2.

The monitoring device 13 is provided in, for example, the building 3. The monitoring device 13 is a device that monitors the operation of the elevator 2. The monitoring device 13 is connected to the control panel 12 so that data regarding the operation of the elevator 2 can be communicated.

The elevator 2 is provided with an operation measuring device and an environment measuring device (not shown).

The operation measuring device is a device that acquires operation measurement data when the brake device 11 operates. The operation measurement data is multi-component data representing information regarding the operation of the brake device 11. A part or all of the operation measuring device is provided in, for example, a brake device 11, a traction machine 7, or a car 10. The operation measuring device includes, for example, a sensor, a switch, and the like. The operation measuring device includes, for example, an ammeter, a brake switch, and an encoder.

The ammeter is provided in, for example, the wiring that supplies power to the coil 17. The ammeter is a sensor that measures the excitation current applied to the coil 17. The brake switch is provided on the brake device 11. The brake switch is a switch that detects the operating state of the brake device 11. The operating state of the brake device 11 includes a brake state and a release state. The brake switch includes, for example, a mechanism for detecting the operating state of the brake device 11 by detecting a mechanical displacement of a part of the brake device 11. The encoder is provided to the motor of the traction machine 7. The encoder is a sensor that outputs the rotation angle of the motor of the traction machine 7 by pulse signals.

Information on each component of the operation measurement data is output to the control panel 12. Alternatively, the information on each component of the operation measurement data is output to the control panel 12 through the brake control device 20. The control panel 12 stores the operation measurement data together with a signal data and a calculation data so that they can be output as operation data. The signal data is multi-component data representing information on the existence or absence of input or output of a control signal. The control signals are, for example, a brake voltage command, a suction command, a release command, a brake voltage command and a brake contact signal. The variables of the control software may include the information of the calculation data. The calculation data is multi-component data calculated based on the operation measurement data, the signal data, and the like.

The environment measuring device is a device that acquires environmental measurement data. The environmental measurement data is multi-component data representing information on the operating environment of the brake device 11. A part or all of the environment measuring device is provided in, for example, the brake device 11, the traction machine 7, or the car 10. The environment measuring device is provided in, for example, the hoistway 4. The plurality of environmental measuring devices include, for example, a scale and a thermometer.

The scale is provided in the car 10. The scale is a sensor that measures the weight of the user(s) or the like in the car 10. The thermometer is provided in the hoistway 4. The thermometer is, for example, a sensor that measures the air temperature. The thermometer may be provided in the brake device 11. In this case, the thermometer is, for example, a sensor that measures the temperature of the brake device 11.

Information on each component of the environmental measurement data is output to the control panel 12. Alternatively, the information of each component of the environmental measurement data is output to the control panel 12 through the brake control device 20. The control panel 12 stores the environmental measurement data so that it can be output.

In the brake device deterioration prediction system 1, an information center 21 is provided outside the building 3, for example. The information center 21 is a site for collecting information on the elevator 2 and other elevators.

The brake device deterioration prediction system 1 is a system that predicts a deterioration time of the brake device 11. Note that the brake device deterioration prediction system 1 may have a function of diagnosing an abnormality of the brake device 11.

The brake device deterioration prediction system 1 includes a data server 22, a maintenance support device 23, and an display device 24.

The data server 22 is provided in, for example, the information center 21. The data server 22 is connected to the monitoring device 13 so that information such as the operation of the elevator 2 can be communicated. The data server 22 includes an observation data storage unit 25, an attribute data storage unit 26, and an abnormality data storage unit 27.

The observation data storage unit 25 is a unit that stores an observation database. The observation database includes a plurality of observation data. The observation data includes the operation data and the environmental measurement data.

The attribute data storage unit 26 is a unit that stores an attribute database. The attribute database includes a plurality of attribute data. The attribute data includes data based on the attributes of the elevator. The attribute data also includes data based on the attributes of the brake device. The attribute data includes information such as the model of the brake device, the device weight of the car, the type of the elevator, and the installation region of the elevator. The type of elevator includes information such as whether it is an observation elevator. The type of elevator relates to, for example, the environment of the hoistway. The type of elevator relates to, for example, the model of the elevator. The installation region of the elevator relates to the environment of the hoistway through, for example, climate. The installation region of the elevator relates to the environment of the hoistway through, for example, the concentration of salt or sulfur in the air.

The abnormality data storage unit 27 is a unit that stores an abnormality history database. The abnormality history database includes a plurality of data of judgment for abnormality of the brake device 11 of the elevator 2 and other elevators.

The maintenance support device 23 is provided in, for example, the information center 21. The maintenance support device 23 includes an observation unit 28, a data acquisition unit 29, a classification unit 30, a conversion unit 31, a learning unit 32, a judgment unit 33, a generation unit 34, a prediction unit 35, a storage unit 36, and a notification unit 37.

The observation unit 28 is a unit that acquires operation data when the brake device 11 operates. The observation unit 28 is connected to the monitoring device 13 to be allowed to acquire the observation data including operation data.

The data acquisition unit 29 is a unit that generates an actual data set. The actual data set contains a plurality of sets of environmental data and operation data acquired in the past from the time of generation. The environmental data includes the environmental measurement data and the attribute data. The data acquisition unit 29 is connected to the observation data storage unit 25 to be allowed to acquire the observation data. The data acquisition unit 29 is connected to the attribute data storage unit 26 to be allowed to acquire the attribute data.

The classification unit 30 is a unit that classifies operation data based on the environmental data. The classification unit 30 is connected to the observation unit 28 to be allowed to acquire the operation data. The classification unit 30 is connected to the observation unit 28 and the attribute data storage unit 26 to be allowed to acquire the environmental measurement data and the attribute data as the environmental data. The classification unit 30 is connected to the data acquisition unit 29 to be allowed to acquire the actual data set.

The conversion unit 31 is a unit that converts operation data into status data and index data.

The status data is multi-component data. Each component of the status data corresponds to each failure phenomenon of the brake device 11. The failure phenomena of the brake device 11 include, for example, sticking of a relay switch contact, deterioration of the spring 19, misalignment of the brake shoe 16, decrease of the braking ability of the brake device 11, and abnormality of the electronic circuit of the brake control device 20.

The index data is data representing deterioration of the brake device 11. The index data is, for example, time-series data representing a preset deterioration index value for each unit of time. The deterioration index value is a value that serves as an index indicating the deterioration of the brake device 11. The deterioration index value may be a multi-component value. The deterioration of the brake device 11 is, for example, wear of the brake shoe 16. The deterioration of the brake device 11 decreases, for example, the braking ability of the brake device 11. The decrease in the braking ability of the brake device 11 causes, for example, slippage in the brake device 11. The unit of time of the time-series data is, for example, one day. The conversion unit 31 is connected to the classification unit 30 to be allowed to acquire the operation data classified based on the environmental data.

The learning unit 32 is a unit that learns a diagnostic model of an abnormality of the brake device 11 using the status data. The learning method by the learning unit 32 is a machine learning method. The learning unit 32 is connected to the conversion unit 31 to be allowed to acquire status data. The learning by the learning unit 32 is performed, for example, by an operation of starting learning by an operator of the information center 21.

The judgment unit 33 is a part for judgment for an abnormality of the brake device 11 based on the diagnostic model learned by the learning unit 32. The judgment is made from the status data, which the conversion unit 31 obtains by converting the operation data, which the observation unit 28 acquires after learning the diagnostic model by the learning unit 32. The judgment unit 33 is connected to the conversion unit 31 to be allowed to acquire the status data. The judgment unit 33 is connected to the learning unit 32 to be allowed to acquire the diagnostic model. The judgment by the judgment unit 33 is performed, for example, each time when the status data is acquired while the judgment unit 33 is activated. The judgment unit 33 is started, for example, by an operation of start by an operator of the information center 21. The judgment unit 33 is connected to the monitoring device 13 to be allowed to output the judgment result.

The generation unit 34 is a unit that generates a deterioration model representing a change-with-time of the deterioration represented by the index data. The deterioration model is a model that predicts future changes in the deterioration index value. The deterioration model includes a trend component, a periodic component and a short-term fluctuation component. The trend component is a component that represents a long-term trend of a monotonous change of increase or decrease. The periodic component is a component that represents the tendency of periodic change. The short-term fluctuation component is a component representing short-term fluctuation. The generation unit 34 is connected to the conversion unit 31 to be allowed to acquire the index data.

The prediction unit 35 is a unit that predicts the deterioration time of the brake device 11 based on the deterioration model generated by the generation unit 34. The deterioration time of the brake device 11 is a time when the deterioration index value reaches a preset threshold value. The prediction unit 35 is connected to the generation unit 34 to be allowed to read the deterioration model.

The storage unit 36 is a unit that stores judgment result data. The judgment result data is data representing the result of the judgment by the judgment unit 33. The storage unit 36 is connected to the judgment unit 33 to be allowed to acquire the judgment result data. The storage unit 36 is a unit for storing prediction result data. The prediction result data is data representing the result of prediction by the prediction unit 35. The storage unit 36 is connected to the prediction unit 35 to be allowed to acquire the prediction result data.

The notification unit 37 is a unit that notifies the judgment result of the abnormality of the brake device 11 by the judgment unit 33. The notification unit 37 is connected to the judgment unit 33 to be allowed to acquire the judgment result data. The notification unit 37 is a unit that notifies the prediction result of the deterioration time of the brake device 11 by the prediction unit 35. The notification unit 37 is connected to the prediction unit 35 to be allowed to acquire the prediction result date. The notification unit 37 generates notification data from the judgment result data or the prediction result data. The notification data is data representing what is notified.

The display device 24 is a device that displays what the acquired data represents. The display device 24 is, for example, a display. The display device 24 is provided in, for example, the information center 21. The display device 24 is connected to the notification unit 37 to be allowed to acquire the notification data.

Subsequently, the function of the brake device deterioration prediction system 1 is described below with reference to FIG. 2.

Figure 2:
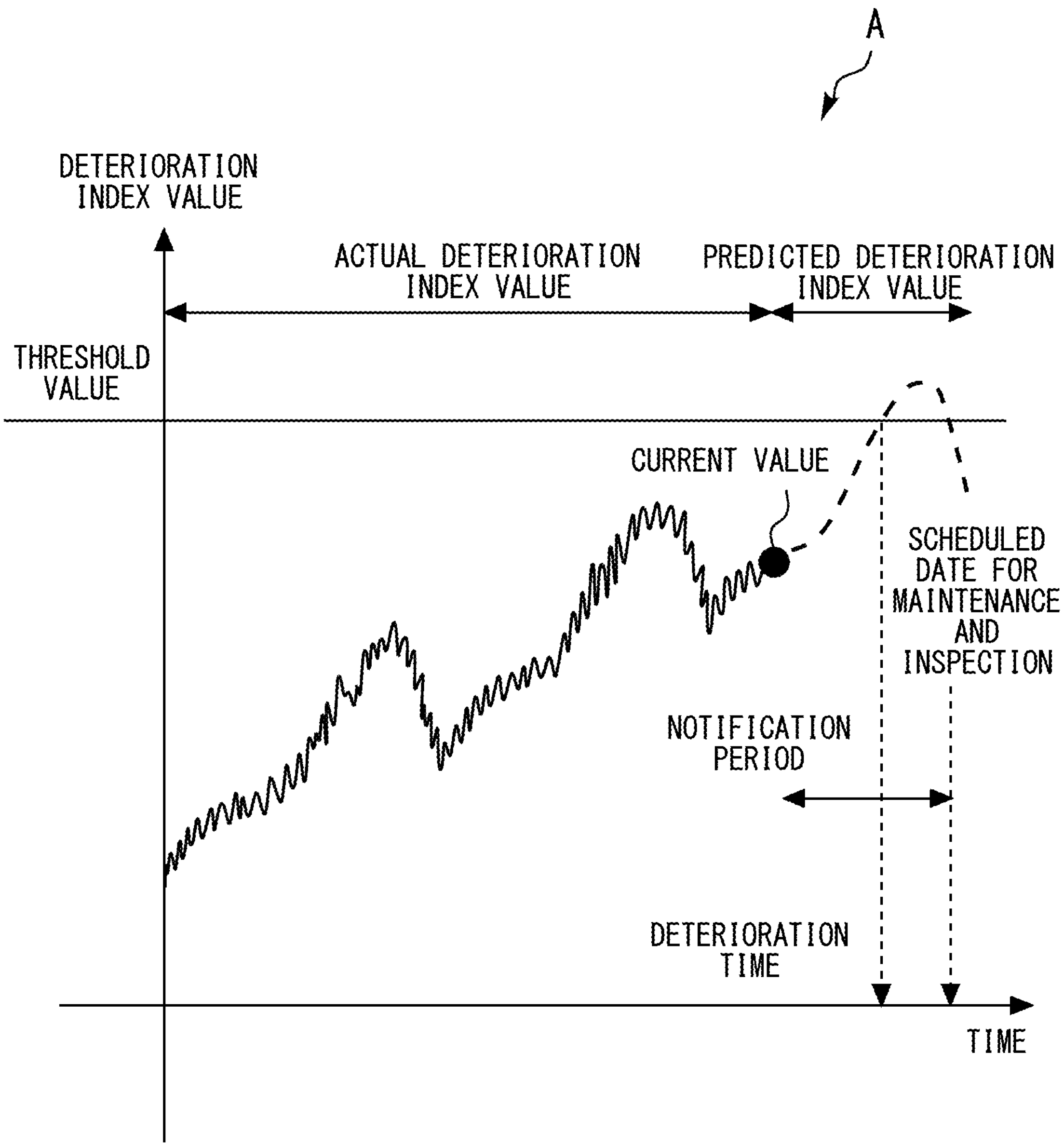
FIG. 2 Diagram showing an example of deterioration prediction by the brake device deterioration prediction system according to Embodiment 1.

FIG. 2 is a diagram showing an example of deterioration prediction by the brake device deterioration prediction system according to Embodiment 1.

In a graph A, an example of index data is shown. The horizontal axis of the graph A represents time. The vertical axis of the graph A represents the deterioration index value. In the graph A, the solid line represents the index data converted from the operation data by the conversion unit 31. The change-with-time of deterioration of the brake device 11 represented by the index data includes a trend component, a periodic component, and a short-term fluctuation component. In the graph A, the trend component is a component that represents a long-term trend of monotonous increase. The periodic component is a component that represents the tendency of periodic change. The short-term fluctuation component is a component representing short-term fluctuation. In the graph A, the broken line represents the prediction result of the deterioration index value by the prediction unit 35.

The operation data is acquired as follows, for example.

The control panel 12 outputs a signal for operating the brake device 11 to the brake control device 20 when the car 10 is stopped.

The brake control device 20 operates the brake device 11 according to the control signal input from the control panel 12. When the brake device 11 operates, the operation measuring device acquires operation measurement data. The operation measurement device outputs operation measurement data to the brake control device 20 or the control panel 12. When the brake device 11 operates, the environment measuring device acquires the environmental measurement data. The environment measuring device outputs the environmental measurement data to the brake control device 20 or the control panel 12. The brake control device 20 outputs the operation measurement data and the environment measurement data that have been input, to the control panel 12.

The control panel 12 calculates the calculation data based on the information such as the operation measurement data and the control signal. The calculation data includes, for example, the data of the position of the car 10 calculated from the count of the pulse signal of the encoder. The calculated data includes, for example, data on the time difference between the output of the brake suction command signal and the detection of the actual operation of the brake device 11 by the brake switch. The calculated data includes, for example, data on the time during which the brake device 11 continues the braking operation. The calculated data includes, for example, data on the frequency of operation of the brake device 11. The control panel 12 outputs operation measurement data, signal data, and calculation data, as operation data, to the observation unit 28 through the monitoring device 13. The control panel 12 outputs the environmental measurement data to the observation unit 28 through the monitoring device 13.

The observation unit 28 acquires operation data and environmental measurement data from the control panel 12 through the monitoring device 13. The observation unit 28 outputs the operation data and the environment measurement data as observation data to the observation data storage unit 25.

The observation data storage unit 25 stores the acquired observation data in the observation database. The observation data includes, for example, flag data, numerical data, and waveform data. The operation data includes, for example, flag data, numerical data, and waveform data, as elements.

The flag data includes information such as whether or not the switch has been operated, whether or not the sensor has been operated, and whether or not there has been a control signal. The flag data is represented by a truth-value, an integer value, a character string, or the like.

The numerical data includes information such as, for example, the value of the physical quantity measured by the sensor. Numerical data includes, for example, the excitation current applied to the coil 17, the duration of time of braking by the brake device 11, the position of the car 10, the air temperature, the temperature of the brake device 11, the frequency of operation of the brake device 11, the air temperature, and the weight of the user(s) in the car 10. Numerical data is represented by an integer value, a real value, or the like.

The waveform data includes information such as a change-with-time of a physical quantity measured by a sensor. The waveform data includes, for example, a pattern change of the excitation current applied to the coil 17, a change-with-time of the position of the car 10, and a change-with-time of the brake temperature. The waveform data is represented by a list or the like including a plurality of numerical values at each predetermined time interval.

The brake device deterioration prediction system 1 starts deterioration prediction by, for example, an operation by an operator of the information center 21.

When the brake device deterioration prediction system 1 starts deterioration prediction, the data acquisition unit 29 generates an actual data set. The data acquisition unit 29 acquires a plurality of observation data acquired during a preset past period starting from the present, from the observation data storage unit 25. The data acquisition unit 29 acquires a plurality of attribute data acquired during a preset past period starting from the present, from the attribute data storage unit 26. The data acquisition unit 29 associates the acquired plurality of observation data and the acquired plurality of attribute data, as a plurality of operation data and environmental data, with the operation time of the brake device 11. The data acquisition unit 29 generates an actual data set based on the association. The data acquisition unit 29 outputs the actual data set to the classification unit 30.

The classification unit 30 classifies, based on the environmental data included in the actual data set, the operation data corresponding to the environmental data. For example, when the environmental data includes labeling data for classification, the classification unit 30 classifies the operation data corresponding to the environmental data having the same value of the labeling data into the same cluster. Alternatively, the classification unit 30 classifies the operation data corresponding to the environmental data classified into the same cluster by, for example, a method of unsupervised learning, into the same cluster. At this time, the classification unit 30 uses, for example, a k-means method, which is a non-hierarchical classification method, as a method of unsupervised learning. Alternatively, the classification unit 30 may use a hierarchical classification method. The classification unit 30 outputs the classified operation data to the conversion unit 31.

The conversion unit 31 converts the operation data into index data for each classification by the classification unit 30, through each of a feature extraction process, a standardization process, an abnormality degree calculation process, and a preliminary process.

In the feature extraction process, the conversion unit 31 converts the plurality of classified operation data into a plurality of feature data. The conversion unit 31 extracts one or more features for each component of the operation data. When an element of the operation data is represented by a truth-value, the conversion unit 31 extracts a numerical value of, for example, +1 or −1 from the true value or the false value as a feature. When a component of the operation data is represented by a numerical value, the conversion unit 31 extracts, for example, the numerical value as it is as a feature. When a component of the operation data is represented by a list of numerical values in, for example, waveform data or the like, the conversion unit 31 extracts, for example, the mean value and standard deviation of the numerical values included in the list as one or more features. Alternatively, when a component of the operation data is represented by a list of numerical values, the conversion unit 31 extracts, for example, a plurality of numerical values included in the list as they are as a plurality of features. The conversion unit 31 may extract the feature from the component of the operation data by a method not illustrated here. The conversion unit 31 generates multi-component feature data. The multi-component feature data each includes one or more features, which have been extracted for each component of the operation data, as a component.

In the standardization process, the conversion unit 31 converts a plurality of feature data into a plurality of standardized data. The standardized data is multi-component data. The conversion unit 31 converts each component of the feature data into each component of the standardized data. The components of the standardized data are each standardized, for example, so that the average for the classification including the original operation data is 0. The components of the standardized data are each standardized, for example, so that the standard deviation for the classification including the original operation data is 1.

In the abnormality degree calculation process, the conversion unit 31 converts a plurality of standardized data into a plurality of abnormality degree data. The abnormality degree data is multi-component data. Each component of the abnormality degree data is an index showing the difference from a normal condition. Each component of the abnormality degree data is calculated from, for example, each component of the feature data. For example, the conversion unit 31 calculates each component of the abnormality degree data by dividing the square deviation from the mean value by the variance for each component of the feature data. The conversion unit 31 may convert the standardized data into the abnormality degree data by another method such as machine learning.

In the preliminary process, the conversion unit 31 converts a plurality of abnormality degree data into index data. The conversion unit 31 applies an unsupervised learning method to the abnormality degree data as a preliminary processing. The method of unsupervised learning is, for example, a method of dimension reduction by PCA (Principal Component Analysis). The conversion unit 31 sorts a plurality of abnormality degree data to which preliminary processing is applied, into each preset unit of time based on the time when the original operation data has been acquired. The conversion unit 31 uses the mean value, the maximum value, or the cumulative value of the values of the abnormality degree data sorted into each unit of time, as the deterioration index value in the unit of time. When the abnormality degree data is multi-component data, the deterioration index value may be a multi-component value. The conversion unit 31 outputs the time-series data of the deterioration index value as index data to the generation unit 34 for each classification by the classification unit 30.

The generation unit 34 generates a deterioration model for each classification by the classification unit 30 for the acquired index data. The generation unit 34 individually generates a trend component and a periodic component for the deterioration model for each classification by the classification unit 30. The generation unit 34 individually generates a trend component and a periodic component by, for example, a regression model. The regression curve in the regression model is, for example, a cumulative Weibull distribution function or a cumulative log-normal distribution function. The regression curve in the regression model is, for example, a curve having a periodic tendency.

The generation unit 34 makes a judgment whether the deterioration model has been successfully generated. The generation unit 34 makes a judgment whether generation of the deterioration model has been successful or failed based on, for example, the residual of the deterioration model. Alternatively, the generation unit 34 makes a judgment whether generation of the deterioration model has been successful or failed based on, for example, errors when the deterioration model is applied to data for test. For example, when the generation unit 34 uses a part of the index data to generate the deterioration model, the data for test is the remaining part of the index data.

When the generation unit 34 judges that the generation of the deterioration model has been failed, the generation unit 34 may generate the deterioration model again by a different method. For example, the generation unit 34 may generate a trend component or a periodic component using different regression curves.

The prediction unit 35 reads the deterioration model that has been judged to be successfully generated. The prediction unit 35 predicts a future value of the deterioration index value based on the deterioration model that has been read. Based on the prediction of the deterioration index value, the prediction unit 35 judges whether the deterioration index value would reach the threshold value in a preset future time starting from the present. The threshold value is, for example, a value preset with respect to the deterioration index value. Alternatively, the threshold value is a value calculated from the index data as a value for judgment of an outlier value. At this time, the threshold value is, for example, a value obtained by adding a constant multiple of the standard deviation to the mean value. Alternatively, the threshold value is a value of the deterioration index value when an abnormality has occurred in the past. At this time, the threshold value is determined based on, for example, the data in the abnormality history database stored in the abnormality data storage unit 27.

When it is judged that the deterioration index value would reach the threshold value in a future time, the prediction unit 35 predicts the deterioration time when the deterioration index value reaches the threshold value.

The prediction unit 35 calculates the reliability of the prediction of the deterioration time. The reliability of the deterioration index value prediction is calculated based on, for example, the standard deviation of the residuals.

The prediction unit 35 outputs the prediction result data to the storage unit 36. The prediction result data includes the deterioration prediction time and the reliability.

The storage unit 36 stores the judgment result.

The prediction unit 35 outputs the judgment result data to the notification unit 37.

When the deterioration time predicted by the prediction unit 35 is within the range of the notification period preset with reference to the maintenance and inspection time, the notification unit 37 generates notification data including the deterioration time. The notification period is, for example, a period before the time when maintenance and inspection are scheduled. Alternatively, when the deterioration time predicted by the prediction unit 35 is within the range of notification period and the reliability of the prediction of the deterioration time is higher than a predetermined standard, the notification unit 37 generates notification data including the deterioration time. The notification unit 37 outputs the notification data to the display device 24, to notify what and how the notification data is, through the display device 24.

The display device 24 displays what and how the notification data is. The display device 24 indicates, for example, "The time when the deterioration index value reaches 100% is 3 months later. The reliability of the prediction is 80%. The scheduled maintenance and inspection time is to be 6 months later." Alternatively, the display device 24 indicates, for example, "The current deterioration index value is 50%. Of the 100 similar cases in the past, 40 cases have been maintained and inspected. The predicted deterioration index value for next month is 70%. Of the 100 similar cases in the past, 80 cases have been maintained and inspected."

Subsequently, an example of the operation for the deterioration prediction of the brake device deterioration prediction system 1 is described below with reference to FIG. 3.

Figure 3:
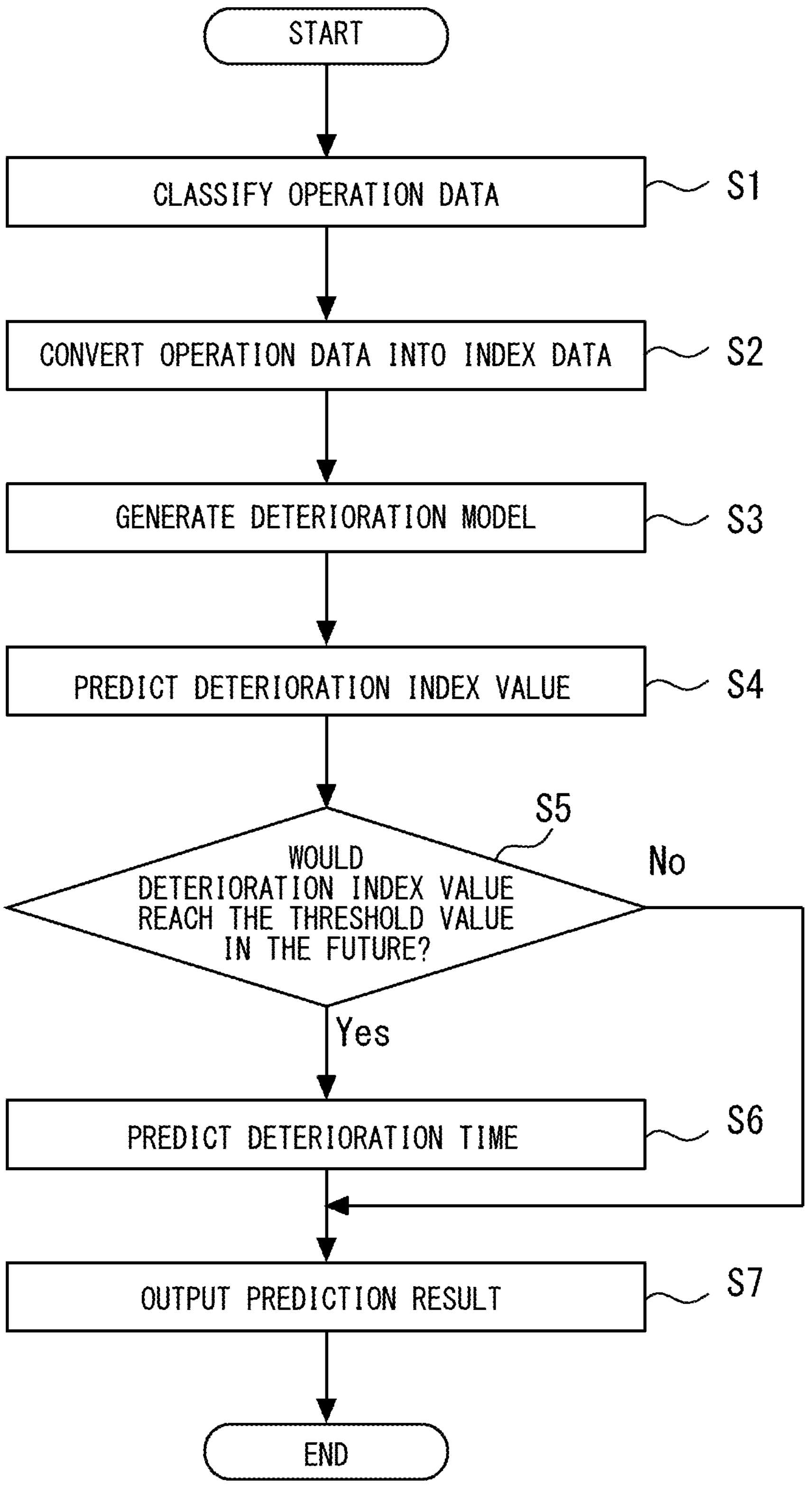
FIG. 3 Flowchart showing an example of the operation of the brake device deterioration prediction system according to Embodiment 1.

FIG. 3 is a flowchart showing an example of the operation of the brake device deterioration prediction system according to Embodiment 1.

In step S1, the classification unit 30 acquires the actual data set from the data acquisition unit 29. The classification unit 30 classifies the operation data corresponding to the environmental data based on the environmental data included in the actual data set. After that, the operation of the brake device deterioration prediction system 1 proceeds to step S2.

In step S2, the conversion unit 31 converts the operation data into index data for each classification by the classification unit 30. After that, the operation of the brake device deterioration prediction system 1 proceeds to step S3.

In step S3, the generation unit 34 generates a deterioration model of the index data for each classification by the classification unit 30. After that, the operation of the brake device deterioration prediction system 1 proceeds to step S4.

In step S4, the prediction unit 35 reads the deterioration model. The prediction unit 35 predicts a future value of the deterioration index value based on the deterioration model that has been read. After that, the operation of the brake device deterioration prediction system 1 proceeds to step S5.

In step S5, the prediction unit 35 judges whether the deterioration index value would reach the threshold value in the future based on the prediction of the deterioration index value. When the judgment result is Yes, the operation of the brake device deterioration prediction system 1 proceeds to step S6. When the judgment result is No, the operation of the brake device deterioration prediction system 1 proceeds to step S7.

In step S6, the prediction unit 35 predicts the deterioration time. After that, the operation of the brake device deterioration prediction system 1 proceeds to step S7.

In step S7, the prediction unit 35 outputs the prediction result to the notification unit 37 and the storage unit 36. After that, the operation of the brake device deterioration prediction system 1 ends.

As described above, the brake device deterioration prediction system 1 according to Embodiment 1 includes an observation unit 28, a conversion unit 31, a generation unit 34, and a prediction unit 35. The observation unit 28 acquires operation data regarding the operation of the brake device 11 when the brake device 11 braking the car 10 of the elevator 2 operates. The conversion unit 31 converts the operation data acquired by the observation unit 28 into index data indicating deterioration of the brake device 11 for each preset unit of time. The generation unit 34 generates a deterioration model including a trend component showing a trend of long-term change and a periodic component showing a periodic change, as a model showing a change-with-time of deterioration represented by the index data. The prediction unit 35 predicts the deterioration time of the brake device 11 based on the deterioration model.

The prediction unit 35 incorporates the effects of seasonal changes and the like into the deterioration model by means of periodic components that represent periodic changes. The prediction unit 35 incorporates the effects of parts wear and the like into the deterioration model by means of the trend component showing the trend of long-term change. As a result, the deterioration time of the brake device 11 can be predicted accurately.

In addition, the conversion unit 31 extracts the feature of the data included in the operation data. The conversion unit 31 converts the operation data into index data based on the feature.

The conversion unit 31 extracts a feature that is meaningful in the deterioration prediction. The generation unit 34 generates a deterioration model based on the index data converted based on the feature. This makes it possible to generate a highly accurate deterioration model.

In addition, the brake device deterioration prediction system 1 includes a classification unit 30. The classification unit 30 classifies the operation data based on the environmental data regarding the operating environment of the brake device 11. The generation unit 34 generates a deterioration model for each classification by the classification unit 30.

The conversion unit 31 can perform conversion processing to index data, using the data sorted into meaningful classifications. As a result, the generation unit 34 can generate a highly accurate deterioration model.

In addition, the generation unit 34 generates a model representing a trend component and a periodic component for each component to generate a deterioration model.

The generation unit 34 can generate a deterioration model by utilizing models that are independently effective for the trend component and the periodic component. This increases the degree of freedom of the deterioration model. In addition, the generation unit 34 can individually adapt the trend component and the periodic component to the corresponding components of the index data. This allows the generation unit 34 to generate the deterioration model more robustly.

In addition, the prediction unit 35 calculates the reliability of the prediction of the deterioration time when predicting the deterioration time.

A maintenance and inspection plan of the brake device 11 may be modified based on the prediction of the deterioration time. At this time, priority is given to highly reliable prediction of the deterioration time, so that the reliability of the maintenance and inspection plan increases.

In addition, the brake device deterioration prediction system 1 includes a notification unit 37. The notification unit 37 notifies the deterioration time when the deterioration time predicted by the prediction unit 35 is within a preset range with reference to the maintenance and inspection time.

If the deterioration time is earlier than the maintenance and inspection time, it may be necessary to accelerate the maintenance and inspection of the brake device 11. In such a case, for example, the operator of the information center 21 can quickly know the result of the prediction of the deterioration time. Therefore, it is easier to revise the maintenance and inspection plan.

In addition, the notification unit 37 notifies the deterioration time when the deterioration time predicted by the prediction unit 35 is within a preset range with reference to the maintenance and inspection time, and the reliability of the prediction of the deterioration time is higher than the preset standard.

As a result, for example, the operator of the information center 21 can revise the maintenance and inspection plan based on the highly reliable prediction of the deterioration time.

Note that the generation unit 34 may update the deterioration model after the maintenance and inspection of the brake device 11.

The condition of deterioration of the brake device 11 may change discontinuously due to, for example, replacement of parts in maintenance and inspection. Therefore, the reliability of the deterioration model may decrease after maintenance and inspection. In such a case, the generation unit 34 can prevent the decrease in the reliability of the prediction of the deterioration time by updating the deterioration model.

In addition, the generation unit 34 may simultaneously generate a model representing a trend component and a periodic component to generate a deterioration model.

The generation unit 34 generates a deterioration model with, for example, a SARIMA (Seasonal AutoRegressive Integrated Moving Average) model. Alternatively, the generation unit 34 generates a deterioration model with, for example, a state space model. At this time, the deterioration model includes a trend component due to, for example, a difference. The deterioration model also includes periodic components due to, for example, seasonal differences. As a result, the generation unit 34 can generate a deterioration model in consideration of the mutual effects of the trend component and the periodic component.

In addition, the brake device deterioration prediction system 1 includes a judgment unit 33 that judges an abnormality in the operation of the brake device 11 from the operation data. In the deterioration prediction of the brake device 11, the conversion unit 31 may include the frequency at which the judgment unit 33 judges that an abnormality has occurred, in the value of the index indicating the deterioration of the brake device 11, to convert the operation data into the index data.

When an abnormality frequently occurs in the brake device 11, it can be estimated that the deterioration of the brake device 11 has progressed. The generation unit 34 can generate a deterioration model in consideration of the frequency of occurrence of abnormalities. The conversion unit 31 may include the frequency of minor abnormalities not notified by the notification unit 37, in the index data as a deterioration index value.

The conversion unit 31 may change the order of each process in the conversion from the operation data to the index data. The conversion unit 31 may omit one or more processes in the conversion from the operation data to the index data. The conversion unit 31 may set the unit of time to one month in the conversion from the operation data to the index data. This indicates the effects of seasonal changes more clearly.

The conversion unit 31 may calculate one abnormality degree component from a plurality of components of the standardized data in the abnormality degree calculation process. As a result, the brake device deterioration prediction system 1 can detect an abnormality that occurs in the relationship between a plurality of components of the standardized data.

In addition, the generation unit 34 may generate a plurality of deterioration models for one classification by the classification unit 30. The prediction unit 35 may predict each deterioration time from each of a plurality of deterioration models. The prediction unit 35 may output the most highly reliable deterioration time, as a prediction result, out of the predicted deterioration times.

The notification unit 37 may output the notification data to the maintenance terminal possessed by a maintenance person, to notify the maintenance person of what and how the notification data is. The notification unit 37 may simultaneously output the notification data to a plurality of output destination to perform notification. The data server 22 is provided in the information center 21 so that the brake device deterioration prediction system 1 can utilize information of the elevator 2 and other elevators. This can increase the accuracy of deterioration prediction of the brake device deterioration prediction system 1.

The classification unit 30 is provided in the information center 21 so that maintenance such as updating the algorithm for classifying operation data is made easier. The conversion unit 31 is provided in the information center 21, so that maintenance such as updating the algorithm for converting operation data is made easier. The generation unit 34 is provided in the information center 21, maintenance such as updating the algorithm for generating the deterioration model made easier. The prediction unit 35 is provided in the information center 21, maintenance such as updating the algorithm for predicting the deterioration time is made easier.

The maintenance support device 23 may be provided in the building 3. At this time, the maintenance support device 23 directly communicates with, for example, the control panel 12. The maintenance support device 23 communicates with the data server 22 through, for example, the monitoring device 13. The data server 22 may be provided in the building 3.

A part or all of the functions of the brake device deterioration prediction system 1 may be realized in the device provided in the building 3.

The electrical connection between systems, devices, device components, parts, and the like in Embodiment 1 may be either a direct or indirect connection. Communication of data and the like between the systems, devices, device components, parts, and the like in Embodiment 1 may be either direct or indirect communication.

Subsequently, an example of a hardware configuration of the brake device deterioration prediction system 1 is described with reference to FIG. 4

Figure 4:
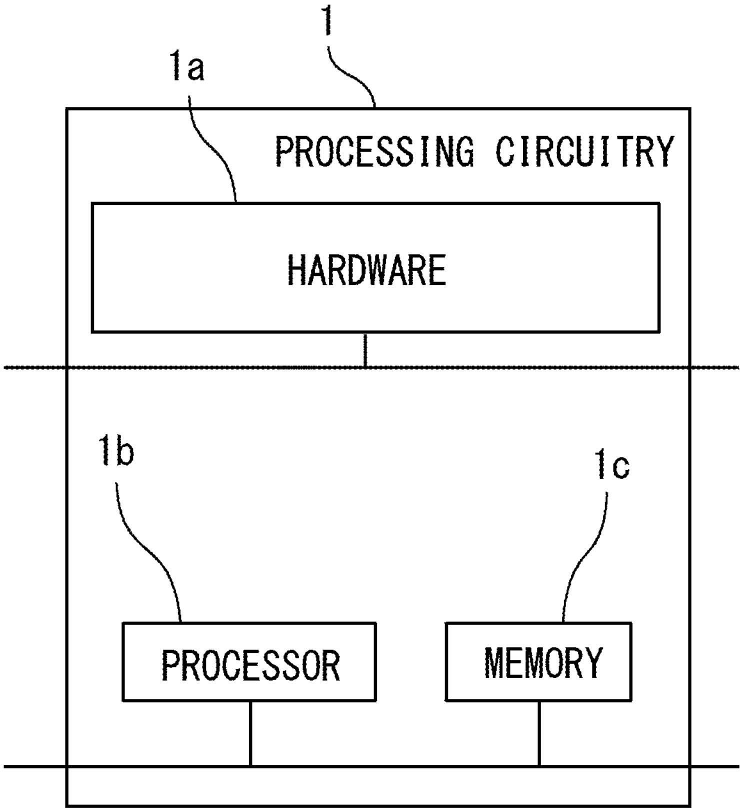
FIG. 4 Diagram showing a hardware configuration of a main part of the brake device deterioration prediction system according to Embodiment 1.

FIG. 4 is a diagram showing a hardware configuration of a main part of the brake device deterioration prediction system according to Embodiment 1.

Each function of the brake device deterioration prediction system 1 can be realized by a processing circuit. The processing circuit includes at least one processor 1*b* and at least one memory 1*c*. The processing circuit may include at least one dedicated hardware 1*a* with or as a substitute for the processor 1*b* and the memory 1*c*.

When the processing circuit includes the processor 1*b* and the memory 1*c*, each function of the brake device deterioration prediction system 1 is realized by software, firmware, or a combination of software and firmware. At least one of the software and firmware is written as a program. The program is stored in the memory 1*c*. The processor 1*b* reads and executes the program stored in the memory 1*c* to realize each function of the brake device deterioration prediction system 1.

The processor 1*b* is also referred to as a CPU (Central Processing Unit), a processing device, a calculation device, a microprocessor, a microcomputer, or a DSP. The memory 1*c* is configured with, for example, a non-volatile or volatile semiconductor memory such as RAM, ROM, flash memory, EPROM, or EEPROM, a magnetic disk, a flexible disk, an optical disc, a compact disc, a MiniDisc, a DVD, or the like.

When the processing circuit includes dedicated hardware 1*a*, the processing circuit is realized by, for example, a single circuit, a composite circuit, a programmed processor, a parallel programmed processor, an ASIC, an FPGA, or a combination thereof.

Each function of the brake device deterioration prediction system 1 can be realized by a processing circuit. Alternatively, each function of the brake device deterioration prediction system 1 can be collectively realized by a processing circuit. For each function of the brake device deterioration prediction system 1, a part may be realized by the dedicated hardware 1*a*, and the other part may be realized by software or firmware. As described above, the processing circuit realizes each function of the brake device deterioration prediction system 1 by the hardware 1*a*, the software, the firmware, or a combination thereof.

INDUSTRIAL APPLICABILITY

The brake device deterioration prediction system according to the present invention can be applied to an elevator.

REFERENCE SIGNS LIST

1 Brake device deterioration prediction system
2 Elevator
3 Building
4 Hoistway
5 Hall
6 Hall door
7 Traction machine
8 Main rope
9 Counter weight
10 Car
11 Brake device
12 Control panel
13 Monitoring device
14 Car door
15 Brake drum
16 Brake shoe
17 Coil
18 Plunger
19 Spring
20 Brake control device
21 Information center
22 Data server
23 Maintenance support device
24 Display device
25 Observation data storage unit
26 Attribute data storage unit
27 Abnormality data storage unit
28 Observation unit
29 Data acquisition unit
30 Classification unit
31 Conversion unit
32 Learning unit
33 Judgment unit
34 Generation unit
35 Prediction unit
36 Storage unit
37 Notification unit
1*a* Hardware
1*b* Processor
1*c* Memory

The invention claimed is:

1. An elevator brake device deterioration prediction system comprising:
processing circuitry
to acquire operation data regarding an operation of a brake device in response to the brake device operating to brake an elevator car;
to convert the operation data into index data, the index data indicating deterioration of the brake device for each preset unit of time;
to generate a deterioration model including a trend component showing a trend of long-term change and a periodic component showing a periodic change, as a model showing a change-with-time of deterioration represented by the index data; and
to predict a deterioration time of the brake device based on the deterioration model, wherein
the processing circuitry classifies the operation data with one or more classifications based on environmental data with respect to an operating environment of the brake device, and
the processing circuitry generates the deterioration model for each classification among the one or more classifications.

2. The elevator brake device deterioration prediction system according to claim 1, wherein:
the processing circuitry extracts a feature of data included in the operation data and converts the operation data into the index data based on the feature.

3. The elevator brake device deterioration prediction system according to claim 1, wherein:
the processing circuitry simultaneously generates a model representing the trend component and the periodic component, to generate the deterioration model.

4. The elevator brake device deterioration prediction system according to claim 1, wherein:

the processing circuitry generates a model representing the trend component and the periodic component for each of the trend component and the periodic component, to generate the deterioration model.

5. The elevator brake device deterioration prediction system according to claim 1, wherein:

the processing circuitry calculates reliability of a prediction with respect to the deterioration time in association with predicting the deterioration time.

6. The elevator brake device deterioration prediction system according to claim 1, wherein:

the processing circuitry updates the deterioration model after maintenance and inspection of the brake device.

7. The elevator brake device deterioration prediction system according to claim 1, wherein:

the processing circuitry notifies the deterioration time in a case where the deterioration time predicted is within a preset range with reference to a maintenance and inspection time.

8. The elevator brake device deterioration prediction system according to claim 5, wherein:

the processing circuitry notifies the deterioration time in a case where the deterioration time predicted is within a preset range with reference to a maintenance and inspection time, and the reliability of the prediction with respect to the deterioration time is higher than a preset standard.

9. The elevator brake device deterioration prediction system according to claim 1, wherein:

the processing circuitry judges an abnormality in the operation of the brake device from the operation data; and the processing circuitry includes a frequency among index values, to convert the operation data into the index data, the frequency being a frequency at which an abnormality is judged to occur, the index values indicating deterioration of the brake device.

10. The elevator brake device deterioration prediction system according to claim 1, further comprising:

one or more environment measuring devices to acquire the environmental data, the one or more environment measuring devices include at least one of a weight sensor and a temperature sensor.

11. The elevator brake device deterioration prediction system according to claim 10, wherein:

the one or more environment measuring devices are provided in at least one of:

the brake device;

a traction machine, configured to move the elevator car vertically through a hoistway;

the elevator car; and the hoistway.

12. The elevator brake device deterioration prediction system according to claim 10, wherein:

the one or more environment measuring devices include the weight sensor provided in the elevator car.

13. The elevator brake device deterioration prediction system according to claim 10, wherein:

the one or more environment measuring devices include the temperature sensor provided in the elevator car.

14. The elevator brake device deterioration prediction system according to claim 10, wherein:

the one or more environment measuring devices include the temperature sensor provided in the brake device.

15. The elevator brake device deterioration prediction system according to claim 1, further comprising:

one or more operation measuring devices to acquire operation measurement data in response to the brake device operating, the one or more operation measuring devices include at least one of a sensor, a switch, an ammeter, a brake switch, and an encoder, wherein the operation measurement data contributes to the acquired operation data.

16. The elevator brake device deterioration prediction system according to claim 1, wherein:

the processing circuitry generates the deterioration model, further including a short-term fluctuation component showing a short-term fluctuation change.

17. The elevator brake device deterioration prediction system according to claim 1, wherein:

the operation data includes at least one of excitation current applied to a coil of the brake device, duration of braking by the brake device, time difference between a brake suction command signal and actual operation of the brake device, frequency of operation of the brake device, and position of the elevator car.

* * * * *